United States Patent
Ieda

(10) Patent No.: US 11,840,590 B2
(45) Date of Patent: Dec. 12, 2023

(54) POLYVINYL ALCOHOL FILM

(71) Applicant: SEKISUI CHEMICAL CO., LTD., Osaka (JP)

(72) Inventor: Yasuyuki Ieda, Kyoto (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 364 days.

(21) Appl. No.: 17/261,966

(22) PCT Filed: Jul. 24, 2019

(86) PCT No.: PCT/JP2019/029078
§ 371 (c)(1),
(2) Date: Jan. 21, 2021

(87) PCT Pub. No.: WO2020/022396
PCT Pub. Date: Jan. 30, 2020

(65) Prior Publication Data
US 2021/0292452 A1     Sep. 23, 2021

(30) Foreign Application Priority Data
Jul. 25, 2018 (JP) .................................. 2018-139224

(51) Int. Cl.
| | |
|---|---|
| *C08F 216/06* | (2006.01) |
| *C08F 8/36* | (2006.01) |
| *C08J 5/18* | (2006.01) |
| *C08K 5/053* | (2006.01) |
| *C08L 29/04* | (2006.01) |

(52) U.S. Cl.
CPC .............. *C08F 216/06* (2013.01); *C08F 8/36* (2013.01); *C08J 5/18* (2013.01); *C08K 5/053* (2013.01); *C08L 29/04* (2013.01); *C08L 2203/16* (2013.01); *C08L 2205/025* (2013.01)

(58) Field of Classification Search
CPC .. C08L 2205/02; C08L 2205/025; C08F 8/36; C08F 216/06; C08J 2429/04; C08J 2329/04
See application file for complete search history.

(56) References Cited

U.S. PATENT DOCUMENTS

| | | |
|---|---|---|
| 2017/0218146 A1 | 8/2017 | Childers et al. |
| 2017/0226338 A1* | 8/2017 | Friedman ............. C11D 3/3753 |
| 2017/0355938 A1 | 12/2017 | Lee et al. |
| 2018/0105338 A1 | 4/2018 | Ieda et al. |
| 2018/0251615 A1 | 9/2018 | Oda et al. |

FOREIGN PATENT DOCUMENTS

| | | |
|---|---|---|
| EP | 3 036 988 | 6/2016 |
| JP | 9-324096 | 12/1997 |
| JP | 2000-109574 | 4/2000 |
| JP | 2001-106854 | 4/2001 |
| JP | 2003-206380 | 7/2003 |
| JP | 2005-179390 | 7/2005 |
| JP | 2017-119851 | 7/2017 |
| WO | 2016/167135 | 10/2016 |
| WO | 2017/043506 | 3/2017 |
| WO | 2017/043511 | 3/2017 |

OTHER PUBLICATIONS

International Search Report (ISR) dated Oct. 21, 2019 in International (PCT) Application No. PCT/JP2019/029078.
Extended European Search Report dated Mar. 18, 2022 in corresponding European Patent Application No. 19840707.4.
Database WPI, Week 201723 2017, Thomson Scientific, London, GB; AN 2017-1893 9R XP002805853.

* cited by examiner

*Primary Examiner* — Jeffrey C Mullis
(74) *Attorney, Agent, or Firm* — WENDEROTH, LIND & PONACK, L.L.P.

(57) ABSTRACT

The present invention is a polyvinyl alcohol-based film comprising a polyvinyl alcohol resin, having tan δ of 0.20 or less at 30° C. in a width direction of the film under an air atmosphere of a relative humidity of 50% RH, and a storage modulus of $11.2 \times 10^6$ to $20 \times 10^6$ Pa at 140° C. in the width direction of the film under a dry atmosphere. According to the present invention, a polyvinyl alcohol-based film having good formability can be provided.

11 Claims, No Drawings

POLYVINYL ALCOHOL FILM

TECHNICAL FIELD

The present invention relates to a polyvinyl alcohol-based film having excellent formability.

BACKGROUND ART

A polyvinyl alcohol-based film has water solubility and is widely used as a packaging material for containing various chemical products such as agricultural chemicals, chemical products, dyes, detergents, fertilizers, cosmetics, and sanitary products. Using the water solubility of the film, such a packaging material is used in applications where a packaging material is directly introduced into an aqueous medium and decomposed or dissolved to obtain a solution, applications where a packaging material opened at the time of use is washed away with water as it is, for disposal, and the like.

When a polyvinyl alcohol-based film is used as a packaging material, water solubility is one of the important physical properties, but the water solubility may decrease over time depending on the type of the chemical product, its contents. From the viewpoint of solving the problem of such a decrease in water solubility, PTL1 discloses an invention relating to a water-soluble film comprising a resin composition obtained by blending 1 to 50 parts by weight of a plasticizer and 5 to 50 parts by weight of starch in 100 parts by weight of sulfonic acid-modified polyvinyl alcohol having a degree of saponification of 90 mol % or more, and it is described that the water-soluble film is excellent in chemical resistance.

CITATION LIST

Patent Literature

PTL1: JP 2001-106854 A

SUMMARY OF INVENTION

Technical Problem

When a polyvinyl alcohol-based film is used as a packaging material, water solubility is important as described above, and in addition to this, good formability is also required. When a polyvinyl alcohol-based film is used as a packaging material, the polyvinyl alcohol-based film needs to be processed into a certain shape by vacuum forming or the like. But, in conventional polyvinyl alcohol-based films, poor forming may occur; for example, they cannot be processed into the desired shape, or even if they can be processed, the shape deforms over time due to residual stress after forming.

The present invention has been made in view of the above circumstances, and it is an object of the present invention to provide a polyvinyl alcohol-based film excellent in formability.

Solution to Problem

The present inventors have studied diligently and, as a result, found that a polyvinyl alcohol-based film in which tan δ at 30° C. in the width direction of the film, and the storage modulus of the film at 140° C. in the width direction of the film are in particular ranges can solve the above problem, and completed the present invention below.

In other words, the present invention provides the following [1] to [12];

[1] A polyvinyl alcohol-based film comprising a polyvinyl alcohol resin, having tan δ of 0.20 or less at 30° C. in a width direction of the film under an air atmosphere of a relative humidity of 50% RH, and a storage modulus of $11.2 \times 10^6$ to $20 \times 10^6$ Pa at 140° C. in the width direction of the film under a dry atmosphere.

[2] The polyvinyl alcohol-based film according to the above [1], wherein a 4% by mass aqueous solution viscosity of the polyvinyl alcohol resin is 10.5 to 25 m·Pas.

[3] The polyvinyl alcohol-based film according to the above [1] or [2], wherein a degree of saponification of the polyvinyl alcohol resin is 85 to 95 mol %.

[4] The polyvinyl alcohol-based film according to any of the above [1] to [3], further comprising a plasticizer.

[5] The polyvinyl alcohol-based film according to the above [4], wherein a content of the plasticizer is 5 to 25% by mass.

[6] The polyvinyl alcohol-based film according to any of the above [1] to [5], wherein the polyvinyl alcohol resin comprises modified polyvinyl alcohol and unmodified polyvinyl alcohol.

[7] The polyvinyl alcohol-based film according to any of the above [1] to [6], wherein the polyvinyl alcohol resin comprises sulfonic acid group-modified polyvinyl alcohol.

[8] The polyvinyl alcohol-based film according to the above [7], wherein a content of the sulfonic acid group-modified polyvinyl alcohol is 60% by mass or less based on a total amount of the polyvinyl alcohol-based film.

[9] The polyvinyl alcohol-based film according to the above [7] or [8], wherein a modifying group content of the sulfonic acid group-modified polyvinyl alcohol is 0.1 to 6 mol %.

[10] The polyvinyl alcohol-based film according to any of the above [7] to [9], wherein a degree of saponification of the sulfonic acid group-modified polyvinyl alcohol is 80 to 99.9 mol %.

[11] A chemical product package comprising the polyvinyl alcohol-based film according to any of the above [1] to [10] and a chemical product contained in the polyvinyl alcohol-based film.

[12] A method for manufacturing a chemical product package, comprising a film forming step of forming the polyvinyl alcohol-based film according to any of the above [1] to [10]; a forming step of forming part of the polyvinyl alcohol-based film in a depressed form by vacuum forming, a chemical product introducing step of introducing a chemical product into a depressed part of the polyvinyl alcohol-based film formed in a depressed form; and an adhesion step of superimposing, over the depressed portion formed in the part of the polyvinyl alcohol-based film, another part of the same polyvinyl alcohol-based film or another polyvinyl alcohol-based film, and adhering the another part of the same polyvinyl alcohol-based film or the another polyvinyl alcohol-based film.

Advantageous Effects of Invention

According to the present invention, a polyvinyl alcohol-based film having good formability can be provided.

DESCRIPTION OF EMBODIMENTS

[Polyvinyl Alcohol-Based Film]

In a polyvinyl alcohol-based film containing a polyvinyl alcohol resin according to the present invention, the polyvinyl alcohol-based film has tan δ of 0.20 or less at 30° C. in a width direction of the film under an air atmosphere of a relative humidity of 50% RH, and a storage modulus of $11.2 \times 10^6$ to $20 \times 10^6$ Pa at 140° C. in the width direction of the film under a dry atmosphere.

Under a dry atmosphere means a state in which the water fraction is 1000 ppm or less. The width direction of the film means the in-plane direction of the film (TD: Transverse Direction) orthogonal to the longitudinal direction of the film (MD: Machine Direction). The width direction of the film is usually the direction in which the breaking elongation is highest.

As used herein, "tan δ at 30° C. in the width direction of the film under an air atmosphere of a relative humidity of 50% RH" is sometimes referred to as "tan δ at 30° C.", and "the storage modulus at 140° C. in the width direction of the film under a dry atmosphere" is sometimes referred to as "the storage modulus at 140° C.". "Polyvinyl alcohol" is sometimes referred to as "PVA".

(tan δ at 30° C.)

In the polyvinyl alcohol-based film (PVA-based film) of the present invention, tan δ at 30° C. in the width direction of the film under an air atmosphere of a relative humidity of 50% RH is 0.20 or less. When the tan δ at 30° C. exceeds 0.20, the shape deforms easily over time, and the formability tends to deteriorate, when the PVA-based film is vacuum-formed. tan δ is a value calculated from a loss modulus and a storage modulus obtained by dynamic viscoelasticity measurement and is obtained by dividing the loss modulus by the storage modulus. The loss modulus is known to be a physical property value that easily reflects the viscous properties of a polymer. It is meant that the larger the loss modulus is, the larger the tan δ is, and the stronger the tendency of the polymer to be viscous at its measurement temperature is. It is considered that when the tan δ at 30° C. exceeds 0.20, the viscosity is high, and due to residual stress, the shape of the formed PVA-based film changes easily over time, and the formability deteriorates easily.

From the viewpoint of making the formability of the PVA-based film better, the tan δ is preferably 0.19 or less. The lower limit of the tan δ is not particularly limited but is practically preferably 0.01.

The measurement of dynamic viscoelasticity is performed under the conditions of a tensile mode and a frequency of 1 Hz using a dynamic viscoelasticity apparatus ("DVA-200" manufactured by IT Keisoku Seigyo KK), and the tan δ at 30° C. in an environment of a relative humidity of 50% RH can be obtained.

(Storage Modulus at 140° C.)

The storage modulus at 140° C. in the width direction of the film under a dry atmosphere for the PVA-based film of the present invention is $11.2 \times 10^6$ to $20 \times 10^6$ Pa. When the storage modulus at 140° C. is less than $11.2 \times 10^6$, the film undergoes plastic deformation and cannot retain a shape having tension in some cases when the film is vacuum-formed. On the other hand, when the storage modulus at 140° C. exceeds $20 \times 10^6$ Pa, the film is hard, and therefore forming easily becomes difficult.

In the present invention, as described above, the storage modulus at 140° C. of the PVA-based film is set in the particular range. It is considered that the PVA-based film in which the storage modulus at 140° C. is set in the particular range is excellent in formability, particularly vacuum formability, by the time-temperature conversion law for polymers. The time-temperature conversion law is an empirical rule that determines the relationship between time and temperature since the relaxation time in the stress relaxation measurement of a polymer object depends on the temperature. In other words, the time-temperature conversion law is the law that when a certain reference temperature is taken, behavior at a temperature higher than the reference temperature corresponds to short time behavior at the reference temperature, and behavior at a temperature lower than the reference corresponds to long time behavior at the reference temperature.

In the vacuum forming of the PVA-based film, the film is instantaneously formed preferably at a forming temperature lower than 140° C., and therefore short time behavior is important. Therefore, it is considered that the storage modulus at 140° C. is related to superiority or inferiority in formability at the forming temperature.

From the viewpoint of making the formability of the PVA-based film of the present invention better, the storage modulus at 140° C. is preferably $11.2 \times 10^6$ to $19.5 \times 10^6$ Pa, more preferably $13.0 \times 10^6$ to $19.5 \times 10^6$ Pa, further preferably $13.5 \times 10^6$ to $19.5 \times 10^6$ Pa, and still more preferably $13.5 \times 10^6$ to $18.0 \times 10^6$ Pa.

The storage modulus can be obtained by dynamic viscoelasticity measurement as in the above-described measurement of the tan δ.

The tan δ at 30° C. and the storage modulus at 140° C. of the PVA-based film can be adjusted in the above ranges by adjusting the composition of the PVA-based film such as the PVA resin, and the plasticizer described later blended as required, the type and degree of polymerization of the PVA resin in the PVA-based film, and the like.

(Polyvinyl Alcohol Resin)

The PVA-based film of the present invention contains a polyvinyl alcohol resin (PVA resin). The PVA resin is obtained by polymerizing a vinyl ester to obtain a polymer, and then saponifying, that is, hydrolyzing, the polymer, according to a conventionally known method. For the saponification, an alkali or an acid is generally used, but an alkali is preferably used. Only one PVA resin may be used, or two or more PVA resins may be used in combination.

Examples of the vinyl ester include vinyl acetate, vinyl formate, vinyl propionate, vinyl butyrate, vinyl pivalate, vinyl versatate, vinyl laurate, vinyl stearate, and vinyl benzoate. The method for polymerizing the vinyl ester is not particularly limited. Examples of the method include a solution polymerization method, a bulk polymerization method, and a suspension polymerization method.

The PVA resin may be unmodified PVA or modified PVA. From the viewpoint of setting the tan δ at 30° C. and the storage modulus at 140° C. of the PVA-based film in the desired ranges, the PVA resin preferably contains unmodified PVA and modified PVA and more preferably consists of unmodified PVA and modified PVA. When the PVA resin contains modified PVA, the chemical resistance of the PVA-based film is good.

As used herein, the chemical resistance means properties that do not decrease the water solubility of the film when a chemical product is packaged and stored.

When the PVA resin contains unmodified PVA and modified PVA, the content of the unmodified PVA is preferably 15% by mass or more, more preferably 25% by mass or more, and preferably 70% by mass or less, more preferably 65% by mass or less, based on the total amount of the PVA-based film.

The content of the modified PVA is preferably 10% by mass or more, more preferably 20% by mass or more, and preferably 60% by mass or less, more preferably 55% by mass or less, based on the total amount of the PVA-based film.

When unmodified PVA and modified PVA are used in combination, the mass ratio of the unmodified PVA to the modified PVA (unmodified PVA/modified PVA) is preferably in the range of 0.3 to 3, more preferably in the range of 0.5 to 2.5.

By using unmodified PVA and modified PVA in combination and adjusting the content as described above, the tan δ at 30° C. and the storage modulus at 140° C. are easily adjusted in the desired ranges, and a PVA-based film excellent in formability and also having good chemical resistance can be obtained.

Examples of the unmodified PVA include unmodified PVA obtained by saponifying a polyvinyl ester. Examples of the modified PVA include modified PVA obtained by saponifying a polymer of a vinyl ester and another unsaturated monomer.

Examples of the another unsaturated monomer include monomers other than vinyl esters, having a carbon-carbon double bond such as a vinyl group, and examples include olefins, (meth)acrylic acid and salts thereof, (meth)acrylates, unsaturated acids other than (meth)acrylic acid, and salts and esters thereof, (meth)acrylamides, N-vinylamides, vinyl ethers, nitriles, vinyl halides, allyl compounds, vinylsilyl compounds, isopropenyl acetate, sulfonic acid group-containing compounds, and amino group-containing compounds.

Examples of the olefins include ethylene, propylene, 1-butene, and isobutene. Examples of the (meth)acrylates include methyl (meth)acrylate, ethyl (meth)acrylate, n-propyl (meth)acrylate, i-propyl (meth)acrylate, n-butyl (meth)acrylate, and 2-ethylhexyl (meth)acrylate.

Examples of the unsaturated acids other than (meth) acrylic acid, and salts and esters thereof include maleic acid and salts thereof, maleates, itaconic acid and salts thereof, itaconates, methylenemalonic acid and salts thereof, and methylenemalonates.

Examples of the (meth)acrylamides include acrylamide, n-methylacrylamide, N-ethylacrylamide, and N,N-dimethylacrylamide. Examples of the N-vinylamides include N-vinylpyrrolidone. Examples of the vinyl ethers include methyl vinyl ether, ethyl vinyl ether, n-propyl vinyl ether, i-propyl vinyl ether, and n-butyl vinyl ether.

Examples of the nitriles include (meth)acrylonitrile. Examples of the vinyl halides include vinyl chloride and vinylidene chloride. Examples of the allyl compounds include allyl acetate and allyl chloride. Examples of the vinylsilyl compounds include vinyltrimethoxysilane.

Examples of the sulfonic acid group-containing compounds include (meth)acrylamidoalkanesulfonic acids such as (meth)acrylamidopropanesulfonic acid, and salts thereof, and olefinsulfonic acids such as ethylenesulfonic acid, allylsulfonic acid, and methallylsulfonic acid, or salts thereof.

Examples of the amino group-containing compounds include allylamine, polyoxyethylene allylamine, polyoxypropylene allylamine, polyoxyethylene vinylamine, and polyoxypropylene vinylamine.

The modified PVA may be modified PVA obtained by adding a hydrophilic group such as a carboxyl group, a sulfonic acid group, an amino group, and a pyrrolidone group to PVA by graft polymerization or the like.

For the modified PVA, particularly, modified PVA modified with at least one modifying group selected from the group consisting of a sulfonic acid group, a pyrrolidone ring group, an amino group, and a carboxyl group is preferred. In other words, specific examples of preferred modified PVA include sulfonic acid group-modified PVA, pyrrolidone ring group-modified PVA, amino group-modified PVA, and carboxyl group-modified PVA. These modifying groups also include, in addition to these functional groups, salts such as sodium and potassium of these functional groups. From the viewpoint of further improving chemical resistance, as the modifying group, a sulfonic acid group is more preferred; that is, as the modified PVA, sulfonic acid group-modified PVA is more preferred.

As described above, the PVA resin preferably contains sulfonic acid group-modified PVA, and the content of the sulfonic acid group-modified PVA is preferably 10% by mass or more, more preferably 20% by mass or more, and preferably 60% by mass or less, more preferably 55% by mass or less, based on the total amount of the PVA-based film.

By adjusting the amount of the sulfonic acid group-modified PVA as described above, the tan δ at 30° C. and the storage modulus at 140° C. are easily set in the desired ranges.

The sulfonic acid group-modified PVA is preferably used in combination with unmodified PVA as described above. In this case, the content of the unmodified PVA is preferably 15% by mass or more, more preferably 25% by mass or more, and preferably 70% by mass or less, more preferably 65% by mass or less, further preferably 60% by mass or less, still more preferably 55% by mass or less, and particularly preferably 50% by mass or less based on the total amount of the PVA-based film. The content of the sulfonic acid group-modified PVA is preferably 10% by mass or more, more preferably 20% by mass or more, and preferably 60% by mass or less, more preferably 55% by mass or less, and still more preferably 50% by mass or less based on the total amount of the PVA-based film. The mass ratio of the unmodified PVA to the sulfonic acid group-modified PVA (unmodified PVA/sulfonic acid group-modified PVA) is preferably in the range of 0.3 to 3, more preferably in the range of 0.5 to 2.5, further preferably in the range of 0.8 to 2.3, and still more preferably in the range of 1 to 2.2.

The sulfonic acid group-modified PVA is not particularly limited as long as it is sulfonic acid group-modified PVA in which a sulfonic acid group is introduced by modification. It is preferably sulfonic acid group-modified PVA in which a sulfonic acid group is bonded to a polymer main chain via a linking group. Examples of the above linking group include an amide group, an alkylene group, an ester group, and an ether group. Especially, a combination of an amide group and an alkylene group is preferred. In order to make the linking group such a combination of an amide group and an alkylene group, the above-described (meth)acrylamidoalkanesulfonic acid or a salt thereof may be used as the unsaturated monomer.

The above sulfonic acid group preferably comprises a sulfonate and is particularly preferably a sodium sulfonate group. When the above modified PVA is sodium sulfonate-modified PVA, the sodium sulfonate-modified PVA preferably has a constituent unit represented by the following formula (1):

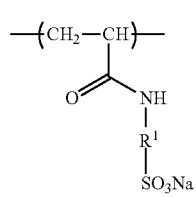

(1)

wherein $R^1$ represents an alkylene group having 1 to 4 carbon atoms.

The pyrrolidone ring group-modified PVA is not particularly limited as long as it is pyrrolidone ring group-modified PVA in which a pyrrolidone ring group is introduced by modification. The pyrrolidone ring group-modified PVA preferably has a constituent unit represented by the following formula (2). In order to obtain pyrrolidone ring group-modified PVA having such a constituent unit, for example, N-vinylpyrrolidone may be used as the another unsaturated monomer.

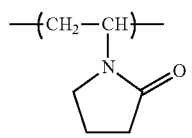

(2)

The amino group-modified PVA is not particularly limited as long as it is amino group-modified PVA in which an amino group is introduced by modification. The amino group-modified PVA preferably has a constituent unit represented by the following formula (3):

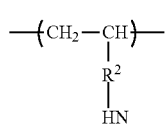

(3)

wherein $R^2$ represents a single bond or an alkylene group having 1 to 10 carbon atoms.

The carboxyl group-modified PVA is not particularly limited as long as it is carboxyl group-modified PVA in which a carboxyl group is introduced by modification. The carboxyl group-modified PVA preferably has a constituent unit represented by the following formula (4-1), (4-2), or (4-3):

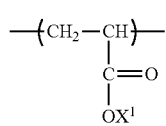

(4-1)

-continued $$\begin{array}{c} OX^2 \\ | \\ C=O \\ | \\ -(CH_2-CH)- \\ | \\ R^3 \\ | \\ C=O \\ | \\ OX^3 \end{array} \quad (4\text{-}2)$$

$$\begin{array}{c} OX^4 \\ | \\ C=O \\ | \\ -(CH_2-CH)- \\ | \\ C=O \\ | \\ OX^5 \end{array} \quad (4\text{-}3)$$

wherein $X^1$, $X^2$, $X^3$, $X^4$, and $X^5$ each independently represent a hydrogen atom, a metal atom, or a methyl group. In other words, the carboxyl group herein also includes salts and methyl esters of the carboxyl group. Examples of the metal atom include a sodium atom. In the above formula (4-2), $R^3$ represents an alkylene group having 1 to 10 carbon atoms.

In the modified PVA modified with at least one modifying group selected from the group consisting of a sulfonic acid group, a pyrrolidone ring group, an amino group, and a carboxyl group, the modifying group content is, for example, 0.1 to 20 mol %.

More specifically, the amount of sulfonic acid group modification of the sulfonic acid group-modified PVA is preferably 0.1 to 6 mol %, more preferably 1 to 5 mol %, from the viewpoint of improving chemical resistance and water solubility.

The amount of modification means the ratio of the number of moles of the modifying group to the total number of moles of the constituent unit of the modified PVA.

The degree of saponification of the PVA resin is preferably 80 to 99.9 mol %, more preferably 85 to 95 mol %. When the degree of saponification is set in such ranges, the water solubility required of the PVA-based film is easily ensured. In the PVA resin, the degree of saponification of the entire PVA resin contained in the PVA-based film may be adjusted to be in these ranges.

The preferred range of the degree of saponification of the PVA resin also differs depending on the presence or absence of modification and the type of the modifying group. For example, the degree of saponification of unmodified PVA is preferably 80 to 99.9 mol % as described above, and more preferably 80 to 95 mol %, further preferably 85 to 92 mol %, from the viewpoint of further improving water solubility. On the other hand, for example, the degree of saponification of modified PVA such as sulfonic acid group-modified PVA is preferably 80 to 99.9 mol % as described above, and more preferably 85 to 99 mol %, further preferably 90 to 98 mol %, from the viewpoint of improving chemical resistance and water solubility in a good balance. When the PVA resin contains unmodified PVA and modified PVA, each degree of saponification is preferably in these ranges.

The above degree of saponification is measured in accordance with JIS K6726. The degree of saponification represents the ratio of units actually saponified to vinyl alcohol units, among units to be converted to vinyl alcohol units by saponification.

The method for adjusting the degree of saponification is not particularly limited. The degree of saponification can be appropriately adjusted by saponification conditions, that is, hydrolysis conditions.

The degree of polymerization of the PVA resin is not particularly limited but is preferably 400 or more, more preferably 700 or more, and further preferably 900 or more. The degree of polymerization of the PVA resin is preferably 2000 or less, more preferably 1800 or less, and further preferably 1500 or less. When the PVA resin contains unmodified PVA and modified PVA, the degree of polymerization of at least one is preferably set in the above ranges of the degree of polymerization, and the degree of polymerization of both is more preferably set in the above ranges of the degree of polymerization. By setting the degree of polymerization in the above ranges, the tan δ at 30° C. of the PVA-based film is easily adjusted in the desired ranges.

When the above degree of polymerization is set at the above lower limit value or more and the above upper limit value or less, the viscosity of a PVA aqueous solution can be made moderate when the polyvinyl alcohol-based film is formed, and the water solubility and formability of the polyvinyl alcohol-based film are easily made good. The above degree of polymerization is measured in accordance with JIS K6726.

From the viewpoint of improving the chemical resistance of the PVA-based film, the degree of polymerization of the unmodified PVA is preferably 1800 or less, more preferably 1500 or less. From a similar viewpoint, the degree of polymerization of the modified PVA is preferably 1800 or less, more preferably 1500 or less, and further preferably 1300 or less. The degree of polymerization of the unmodified PVA and the degree of polymerization of the modified PVA are preferably set at 400 or more.

When the PVA resin contains unmodified PVA and modified PVA, each degree of polymerization is preferably adjusted in the above-described ranges from the viewpoint of improving chemical resistance.

In the PVA resin, the 4% by mass aqueous solution viscosity is preferably 10.5 m·Pas or more, more preferably 12.0 m·Pas or more. The viscosity is preferably 25 m·Pas or less, more preferably 20 m·Pas or less, and further preferably 15 m·Pas or less. In the PVA resin, the 4% by mass aqueous solution viscosity of the entire PVA resin contained in the PVA-based film may be adjusted to be in these ranges. By setting the viscosity of the PVA resin in such ranges, the strength of the PVA-based film is also easily made good.

Such viscosity can be measured at 20° C. in accordance with JIS K 6726. When the PVA resin contains unmodified PVA and modified PVA, the viscosity of at least one is preferably set in the above ranges of viscosity, and the viscosity of both is more preferably set in the above ranges of viscosity.

The PVA-based film is mainly composed of the PVA resin. The content of the PVA resin is specifically preferably 70% by mass or more, more preferably 75% by mass or more, and further preferably 80% by mass or more based on the total amount of the PVA-based film. The content of the PVA resin is preferably 97% by mass or less, more preferably 95% by mass or less, and further preferably 93% by mass or less. When the content of the PVA resin is set at the above lower limit or more, the PVA-based film easily has good water solubility. When the content of the PVA resin is set at the above upper limit value or less, additives such as a plasticizer described later can be moderately blended in the PVA-based film.

(Plasticizer)

The PVA-based film of the present invention preferably further contains a plasticizer. When the PVA-based film contains the plasticizer, for example, the glass transition point lowers, and the durability at low temperature can be improved. In addition, the water solubility of the PVA-based film can also be improved.

The plasticizer is not particularly limited. Examples of the plasticizer can include polyhydric alcohols such as glycerin, diglycerin, diethylene glycol, trimethylolpropane, triethylene glycol, dipropylene glycol, and propylene glycol, polyethers such as polyethylene glycol and polypropylene glycol, phenol derivatives such as bisphenol A and bisphenol S, amide compounds such as N-methylpyrrolidone, compounds obtained by adding ethylene oxide to polyhydric alcohols such as glycerin, pentaerythritol, and sorbitol, and water. These may be used singly, or two or more of these may be used, but two or more of these are preferably used.

Among the above plasticizers, polyhydric alcohols are preferred, and at least one or more plasticizers selected from the group consisting of glycerin, diglycerin, and trimethylolpropane are more preferably used, from the viewpoint of adjusting the tan δ at 30° C. and the storage modulus at 140° C. of the PVA-based film of the present invention in the desired ranges to make formability excellent, and the viewpoint of making water solubility good. Especially, as the plasticizer, diglycerin is particularly preferably used from the viewpoint of making the formability of the PVA-based film of the present invention extremely excellent.

The molecular weight of the plasticizer is preferably 90 or more, more preferably 92 or more, and preferably 1200 or less, more preferably 1000 or less.

The content of the plasticizer is preferably 5 to 25% by mass based on the total amount of the polyvinyl alcohol-based film. By setting the content of the plasticizer at 5% by mass or more, the effect of blending the plasticizer is easily obtained. By setting the content of the plasticizer at 25% by mass or less, the bleedout of the plasticizer decreases, and the blocking resistance is good. The content of the plasticizer is more preferably 7% by mass or more, further preferably 10% by mass or more. The content of the plasticizer is more preferably 22% by mass or less, further preferably 17% by mass or less.

(Other Additives)

The PVA-based film of the present invention may further appropriately contain additives usually used in a PVA-based film, such as inorganic particles, a colorant, a perfume, an antifoaming agent, a release agent, and an ultraviolet absorbing agent, as required.

The thickness of the PVA-based film of the present invention is not particularly limited and is, for example, 5 to 150 μm. When the thickness is set at the above lower limit or more, the strength of the film can be increased. When the thickness is set at the above upper limit or less, the packaging properties and the heat sealing properties as a packaging film are good, and the productivity improves. From these viewpoints, the thickness of the PVA-based film is preferably 20 μm, more preferably 30 μm or more. The thickness of the PVA-based film is preferably 100 μm or less, more preferably 90 μm or less.

The PVA-based film of the present invention is used for packaging various substances and preferably used, for example, for PVA-based films for containing various chemical products such as agricultural chemicals, industrial chemicals, dyes, detergents, fertilizers, cosmetics, sanitary products, and medicines.

[Method for Manufacturing Polyvinyl Alcohol-Based Film]

The method for manufacturing the PVA-based film of the present invention is not particularly limited. Examples of the method include a method of diluting PVA, and an additive such as a plasticizer added as required, with water to obtain a PVA aqueous solution, casting the PVA aqueous solution on a supporting member, and drying the PVA aqueous solution to form a film. The PVA aqueous solution may be cast after being appropriately passed through a filter.

Examples of the method for casting the PVA aqueous solution on a supporting member include a casting method, a roll coating method, a lip coating method, a spin coating method, a screen coating method, a fountain coating method, a dipping method, and a spraying method.

In the PVA aqueous solution, the components other than water are diluted with water at a concentration of preferably 35% by mass or less, more preferably 25% by mass or less, and further preferably 20% by mass or less based on the total amount of the aqueous solution. The components other than water may be diluted with water at a concentration of preferably 8% by mass or more, more preferably 10% by mass or more, and further preferably 12% by mass or more.

When the concentration is within the above range, the viscosity of the PVA aqueous solution is moderate, and the casting of the PVA aqueous solution is easy. By setting the concentration at the lower limit value or more, the drying time shortens, and a PVA-based film having good quality is easily obtained.

The above supporting member may be one that can retain the PVA aqueous solution on the surface during the casting of the PVA aqueous solution and support the obtained PVA film. Examples of the material of the above supporting member include polyolefins, polyesters, and acrylic resins. A supporting member comprising a material other than these may be used. The supporting member may be a supporting member in the form of a sheet or a film but may be a supporting member having another shape.

The drying after the above PVA aqueous solution is cast may be performed by any method. Examples of the method include a method of natural drying and a method of heating and drying at a temperature equal to or less than the glass transition temperature of the PVA resin.

In the PVA-based film obtained by the method for casting the PVA aqueous solution on a supporting member, the direction (TD) perpendicular to the direction in which the PVA aqueous solution is cast on the supporting member (casting direction: MD) is the width direction of the film.

Examples of other methods for manufacturing the PVA-based film of the present invention include a method of melting and forming a PVA composition containing a PVA resin, an additive such as a plasticizer blended as required, and water.

As the melt-forming method, known forming methods such as extrusion, inflation molding, and blow molding can be used. Especially, extrusion is preferred.

In the case of extrusion, a PVA-based film in the form of a thin film can be obtained by melting the PVA composition in an extruder and then extruding it in the form of a thin film by a mold.

(Method for Using Polyvinyl Alcohol-Based Film)

The PVA-based film of the present invention can be used as a chemical product packaging film for packaging various chemical products. The chemical products are not particularly limited. Examples of the chemical products include agricultural chemicals, industrial chemicals, dyes, detergents, fertilizers, cosmetics, sanitary products, and medicines. Among these, detergents are preferred. The detergent is preferably a liquid, and the PVA-based film of the present invention is preferably used for packaging particularly a liquid detergent. The liquid detergent means a detergent that is a liquid at normal temperature (25° C.) and normal pressure (1 atmosphere).

A package can be provided using a chemical product packaging film. The package specifically comprises a chemical product packaging film and a chemical product contained in the chemical product packaging film. The chemical product is appropriately selected from the group consisting of the above listed ones and is preferably a liquid detergent.

When a package is fabricated using a chemical product packaging film, the chemical product packaging film is preferably processed in the form of a bag in order to contain a chemical product. When a chemical product packaging film is processed in the form of a bag, and a chemical product is contained, for example, the following method is preferably applied.

First, part of a chemical product packaging film is formed in a depressed form. When part of a chemical product packaging film is formed in a depressed form, a known forming method can be applied, but vacuum forming is preferably applied. Then, after a chemical product is introduced into the depressed part of the chemical product packaging film partially formed in a depressed form, another chemical product packaging film may be superimposed from above so as to cover the depressed part, and the periphery may be adhered. The adhering means is not particularly limited, and heat sealing, an adhesive, or the like may be used, or adhesion may be performed by applying water. Alternatively, a bag may be formed by folding one chemical product packaging film and adhering the periphery.

In another embodiment of the present invention, a method for manufacturing a chemical product package, comprising the following film forming step, forming step, chemical product introducing step, and adhesion step is also provided.

The above film forming step is the step of forming a polyvinyl alcohol-based film.

The above forming step is the step of forming part of the polyvinyl alcohol-based film in a depressed form by vacuum forming.

The above chemical product introducing step is the step of introducing a chemical product into the depressed part of the polyvinyl alcohol-based film formed in a depressed form.

The above adhesion step is the step of superimposing, over the depressed portion formed in the part of the polyvinyl alcohol-based film, another part of the same polyvinyl alcohol-based film or another polyvinyl alcohol-based film, and adhering the another part of the same polyvinyl alcohol-based film or the another polyvinyl alcohol-based film.

In this manner, a chemical product package comprising a polyvinyl alcohol-based film and a chemical product contained in the polyvinyl alcohol-based film is obtained.

In the above film forming step, the methods described for the above-described methods for manufacturing polyvinyl alcohol-based films can be used without limitation, and, for example, coating forming such as a method of forming a film by casting on a supporting member and drying, extrusion, inflation molding, and blow molding can be applied. In the case of extrusion, a PVA film in the form of a thin film can be obtained by melting a PVA composition in an extruder and then extruding it in the form of a thin film by a mold.

The depth of the depressed part formed in the above forming step is, for example 1 to 50 (mm), preferably 3 to 30 (mm), and more preferably 6 to 20 (mm). When the depth of the depressed part is within the above ranges, the high vacuum formability of the above polyvinyl alcohol-based film is easily exhibited.

The type of the chemical product introduced in the above chemical product introducing step is not particularly limited, and those of the above mentioned types can be used. The shape of the chemical product is not particularly limited either, and the chemical product may be liquid or a powder or may be a tablet.

In the above adhesion step, over the depressed portion formed in the part of the polyvinyl alcohol-based film, another part of the same polyvinyl alcohol-based film or another polyvinyl alcohol-based film is superimposed and adhered. Thus, the chemical product is sealed in the depressed portion. Here, "another part of the same polyvinyl alcohol-based film" means a portion other than the depressed portion of the polyvinyl alcohol-based film in which the depressed portion is formed, and, for example, a portion other than the depressed portion may be folded and adhered. "Another polyvinyl alcohol-based film" means a polyvinyl alcohol-based film different from the polyvinyl alcohol-based film in which the depressed portion is formed, and a separately provided polyvinyl alcohol-based film may be superimposed over the depressed portion and adhered.

The adhesion is preferably performed on the periphery of the depressed portion. The adhesion means is not particularly limited, and heat sealing, an adhesive, or the like may be used, or adhesion may be performed by applying water.

EXAMPLES

The present invention will be described in more detail by Examples, but the present invention is not limited in any way by these examples.

The methods for measuring and evaluating physical properties are as follows.

[Dynamic Viscoelasticity Measurement]

Using a dynamic viscoelasticity measuring apparatus ("DVA-200" manufactured by IT Keisoku Seigyo KK), the storage modulus and the loss modulus were continuously measured at a measurement frequency of 1 Hz while the temperature of a film was increased from 20 to 200° C. at a temperature increase rate of 3° C./min. The measurement was performed in a tensile mode. Thus, the tan δ at 30° C. in the width direction of the film under an air atmosphere of a relative humidity of 50% RH, and the storage modulus at 140° C. in the width direction of the film under a dry atmosphere were measured.

[Evaluation of Vacuum Formability]

A package was fabricated with obtained PVA-based films by the following procedure using a Lab scale pouching unit manufactured by EME engel.

A PVA-based film (bottom film) was fixed on the mold (40 mm long, 35 mm wide, and 13 mm high) of the above apparatus, and a PVA-based film (top film) was also fixed to the top of the apparatus. The bottom film was heated for 10 seconds by a dryer that generated hot air at 100° C., and the bottom film was vacuum-formed in a depressed form corresponding to the mold.

Then, 15 ml of a mixed liquid detergent (amount of water: 14% by mass) obtained by adding 5.2 g of water to 90 g of a liquid detergent (manufactured by Unilever, trade name "Persil Non-Bio", amount of water: 9% by mass) was introduced into the depresses part of the formed PVA-based film. 1.5 g of water was applied to the top film, and the top film and the bottom film were compression-bonded. After they were compression-bonded for 30 seconds, the vacuum was released to obtain a package. The vacuum formability was evaluated according to the following criteria:

(Evaluation)

1. The package had the shape as designed.
2. The shape deviated slightly from the shape as designed but was almost the shape as designed.
3. The shape deviated from the shape as designed.
4. The shape deviated largely from the shape as designed.

[Water Solubility after Chemical Resistance Test]

An obtained PVA-based film was exposed to an environment of 23° C. and 50% RH for 24 hours, and then the PVA-based film was cut to 4 cm (TD direction)×5 cm (MD direction). Next, the cut film and 35 ml of a mixed liquid detergent (amount of water: 14% by mass) obtained by adding 5.2 g of water to 90 g of a liquid detergent (manufactured by Unilever, trade name "Persil Non-Bio", amount of water: 9% by mass) were added to a 50 ml screw tube bottle and left standing in a state of immersion at 55° C. for 7 days.

Then, the film was removed, and the mixed liquid detergent adhering to the surface was wiped off with KIM-TOWEL. The film was cut to a size of 3 cm×3 cm as a chemical resistance evaluation film, weighed, and then fixed to a jig. Then, 500 ml of water was placed in a 500 ml beaker. While the water was stirred by a magnet stirrer so that the bottom of the vortex reached the mark of 400 ml, the water temperature was kept at 23° C., and the time when it became impossible to visually recognize the residue of the film from the jig was measured as dissolution time.

(Evaluation)

1. the dissolution time is 100 seconds or less
2. the dissolution time exceeds 100 seconds and is 500 seconds or less
3. the dissolution time exceeds 500 seconds The components used in the Examples and Comparative Examples are as follows:

PVA (1): sulfonic acid group-modified PVA, degree of polymerization: 1200, degree of saponification: 95.4 mol %, amount of sulfonic acid group modification: 4 mol %, 4% by mass aqueous solution viscosity (20° C.): 12.1 m·Pas PVA (2): sulfonic acid group-modified PVA, degree of polymerization: 1700, degree of saponification: 96.1 mol %, amount of sulfonic acid group modification: 4 mol %, 4% by mass aqueous solution viscosity (20° C.): 22.5 m·Pas PVA (3): unmodified PVA, degree of polymerization: 1300, degree of saponification: 88.0%, 4% by mass aqueous solution viscosity (20° C.): 14 m·Pas PVA (4): unmodified PVA, degree of polymerization: 2000, degree of saponification: 88.0%, 4% by mass aqueous solution viscosity (20° C.): 32 m·Pas GL: glycerin, reagent, manufactured by Wako Pure Chemical Industries, Ltd., molecular weight: 92

TMP: trimethylolpropane: reagent, manufactured by Wako Pure Chemical Industries, Ltd., molecular weight: 134

DGL: diglycerin: reagent, manufactured by Wako Pure Chemical Industries, Ltd., molecular weight: 166

Example 1

PVA (1), PVA (3), GL, and TMP were dissolved and dispersed in water so as to provide 27% by mass of PVA (1), 57.5% by mass of PVA (3), 13% by mass of GL, and 2.5% by mass of TMP based on the total amount of a PVA-based film as shown in Table 1, thereby preparing a PVA aqueous solution having a concentration of 15% by mass.

The obtained PVA aqueous solution was passed through a filter having an opening of 20 μm, and then applied onto a polyethylene terephthalate (PET) film (thickness: 50 μm), a supporting member, by a lip coater method. Then, the PVA aqueous solution was dried at 70° C. for 10 minutes and then at 110° C. for 10 minutes to form a PVA-based film (thickness: 50 μm) on the supporting member. The laminated body comprising the supporting member and the PVA-based film was wound around a paper core having an inner diameter of 3 inches. Various evaluations were performed after the supporting member was peeled. The results are shown in Table 1.

Examples 2 to 8 and Comparative Examples 1 to 5

Operations were carried out as in Example 1 except that the blending of the PVA aqueous solution was changed as shown in Table 1. The results are shown in Table 1.

TABLE 1

| | Blending (% by mass) | | | | | | | PVA resin (entire) | | Viscoelasticity | | | After chemical resistance test | |
|---|---|---|---|---|---|---|---|---|---|---|---|---|---|---|
| | PVA resin | | | | Plasticizer | | | 4% by mass aqueous solution viscosity (mPa·s) | Degree of saponification (mol %) | tan δ 30° C. | Storage modulus at 140° C. (Pa) | Vacuum formability | Dissolution time (seconds) | Determination |
| | PVA(1) modified | PVA(2) modified | PVA(3) unmodified | PVA(4) unmodified | GL | DGL | TMP | | | | | | | |
| Example 1 | 27.0 | | 57.5 | | 13.0 | | 2.5 | 13.4 | 90.4 | 0.09 | 17.3 × 10⁶ | 1 | 310 | 2 |
| Example 2 | 42.3 | | 42.3 | | 13.0 | | 2.5 | 13.1 | 91.7 | 0.16 | 12.9 × 10⁶ | 2 | 260 | 2 |
| Example 3 | 51.0 | | 34.0 | | 15.0 | | | 12.9 | 92.4 | 0.17 | 11.8 × 10⁶ | 2 | 230 | 2 |
| Example 4 | 54.9 | | 29.6 | | 13.0 | | 2.5 | 12.8 | 92.8 | 0.19 | 11.3 × 10⁶ | 2 | 210 | 2 |
| Example 5 | | 27.0 | 57.5 | | 13.0 | | 2.5 | 16.7 | 90.6 | 0.11 | 19.5 × 10⁶ | 1 | 330 | 2 |
| Example 6 | 26.2 | | 55.8 | | 4.0 | 14.0 | | 13.4 | 90.4 | 0.18 | 16.4 × 10⁶ | 1 | 340 | 2 |
| Example 7 | 41.0 | | 41.0 | | 9.0 | 9.0 | | 13.1 | 91.7 | 0.17 | 14.7 × 10⁶ | 1 | 290 | 2 |
| Example 8 | 26.2 | | 55.8 | | 4.0 | | 14.0 | 13.4 | 90.4 | 0.17 | 13.0 × 10⁶ | 2 | 320 | 2 |
| Comparative Example 1 | 88.0 | | | | 12.0 | | | 12.1 | 95.4 | 0.36 | 8.3 × 10⁶ | 4 | 350 | 2 |
| Comparative Example 2 | 71.8 | | 12.7 | | 13.0 | | 2.5 | 12.4 | 94.3 | 0.33 | 11.1 × 10⁶ | 4 | 120 | 2 |
| Comparative Example 3 | | 27.0 | | 57.5 | 13.0 | | 2.5 | 29.0 | 90.6 | 0.21 | 16.6 × 10⁶ | 3 | No breakage | 3 |
| Comparative Example 4 | | 71.8 | 12.7 | | 13.0 | | 2.5 | 21.2 | 94.9 | 0.24 | 14.0 × 10⁶ | 4 | 160 | 2 |
| Comparative Example 5 | 23.7 | | 50.3 | | 26.0 | | | 13.4 | 90.4 | 0.14 | 10.5 × 10⁶ | 3 | 300 | 2 |

From the results of the Examples, the PVA-based films of the Examples in which the tan δ at 30° C. and the storage modulus at 140° C. were in the particular ranges, the vacuum formability was good. On the other hand, the PVA-based films of the Comparative Examples in which at least one of the tan δ at 30° C. and the storage modulus at 140° C. was not in the particular ranges, the vacuum formability was not good.

The invention claimed is:

1. A polyvinyl alcohol-based film comprising a polyvinyl alcohol resin and a plasticizer comprising diglycerin, wherein the film has a tan δ of 0.20 or less at 30° C. in a width direction of the film under an air atmosphere of a relative humidity of 50% RH, and a storage modulus of $11.2 \times 10^6$ to $20 \times 10^6$ Pa at 140° C. in the width direction of the film under a dry atmosphere wherein a content of the plasticizer is 5 to 25% by mass.

2. The polyvinyl alcohol-based film according to claim 1, wherein a 4% by mass aqueous solution viscosity of the polyvinyl alcohol resin is 10.5 to 25 m·Pas.

3. The polyvinyl alcohol-based film according to claim 1, wherein a degree of saponification of the polyvinyl alcohol resin is 85 to 95 mol %.

4. The polyvinyl alcohol-based film according to claim 1, wherein the polyvinyl alcohol resin comprises modified polyvinyl alcohol and unmodified polyvinyl alcohol.

5. The polyvinyl alcohol-based film according to claim 1, wherein the polyvinyl alcohol resin comprises sulfonic acid group-modified polyvinyl alcohol.

6. The polyvinyl alcohol-based film according to claim 5, wherein a content of the sulfonic acid group-modified polyvinyl alcohol is 60% by mass or less based on a total amount of the polyvinyl alcohol-based film.

7. The polyvinyl alcohol-based film according to claim 5, wherein a modifying group content of the sulfonic acid group-modified polyvinyl alcohol is 0.1 to 6 mol %.

8. The polyvinyl alcohol-based film according to claim 5, wherein a degree of saponification of the sulfonic acid group-modified polyvinyl alcohol is 80 to 99.9 mol %.

9. A chemical product package comprising the polyvinyl alcohol-based film according to claim 1 and a chemical product contained in the polyvinyl alcohol-based film.

10. A method for manufacturing a chemical product package, comprising:
    a film forming step of forming the polyvinyl alcohol-based film according to claim 1;
    a forming step of forming part of the polyvinyl alcohol-based film in a depressed form by vacuum forming,
    a chemical product introducing step of introducing a chemical product into a depressed part of the polyvinyl alcohol-based film formed in a depressed form; and
    an adhesion step of superimposing, over the depressed portion formed in the part of the polyvinyl alcohol-based film, another part of the same polyvinyl alcohol-based film or another polyvinyl alcohol-based film, and adhering the another part of the same polyvinyl alcohol-based film or the another polyvinyl alcohol-based film.

11. The polyvinyl alcohol-based film according to claim 1, wherein the polyvinyl alcohol resin comprises only one polyvinyl alcohol resin.

* * * * *